United States Patent [19]

Lucian

[11] 3,825,709
[45] July 23, 1974

[54] TRANSDUCER DEVICE

[76] Inventor: Arsene N. Lucian, P.O. Box 300, Manasquan, N.J. 08736

[22] Filed: Oct. 27, 1972

[21] Appl. No.: 301,268

Related U.S. Application Data

[63] Continuation-in-part of Ser. No. 37,965, May 18, 1970, Pat. No. 3,701,868.

[52] U.S. Cl............... 200/192, 200/214, 335/49, 310/2, 179/133
[51] Int. Cl. .................................. H01h 29/00
[58] Field of Search .......... 200/214, 182, 192, 191, 200/193, 194, 211; 335/49, 50, 52; 310/2; 179/133

[56] References Cited
UNITED STATES PATENTS
2,695,938   11/1954   Hancock ............................. 200/214
3,249,724    5/1966   Hurvitz ............................... 200/192

*Primary Examiner*—Herman J. Hohauser
*Attorney, Agent, or Firm*—Darby & Darby

[57] ABSTRACT

A transducer using the electrocapillary effect at a single interface of a liquid metal and an electrolyte in which the metal is moved, by a force applied thereto, to disturb the interfacial tension, to result in the production of a voltage.

16 Claims, 5 Drawing Figures

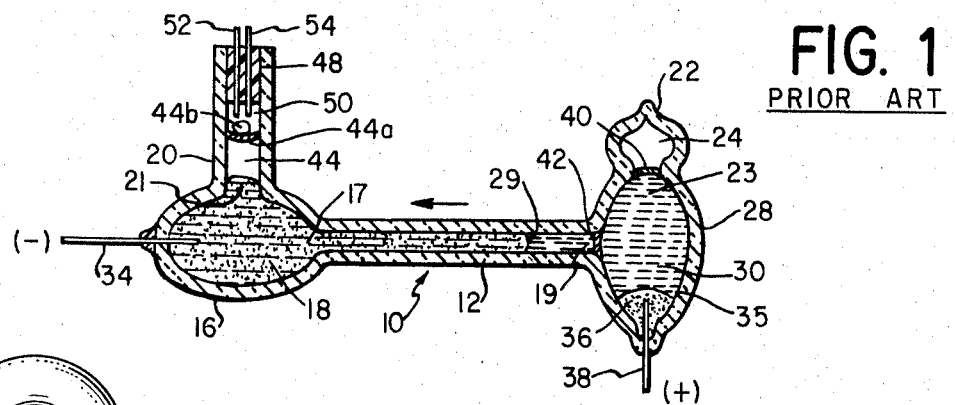
FIG. 1 PRIOR ART
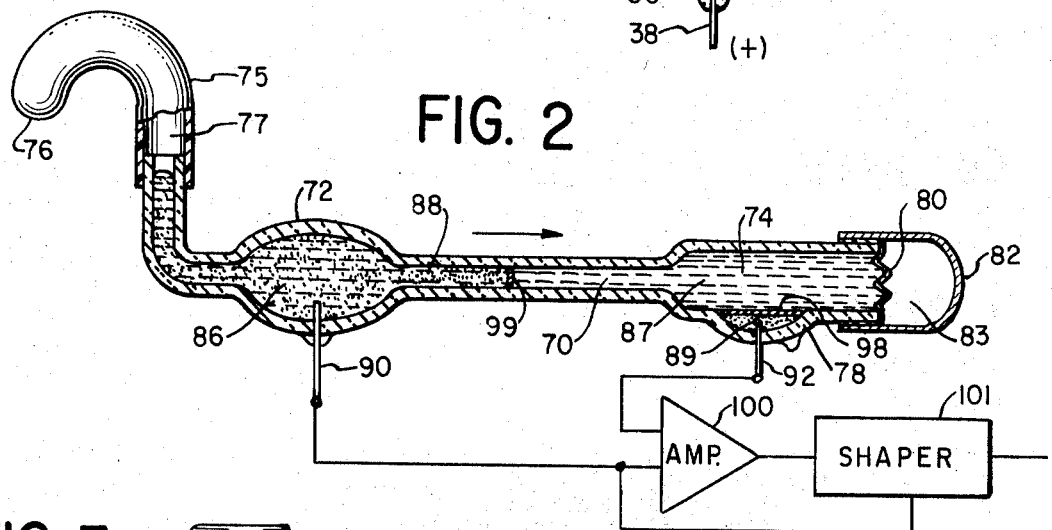
FIG. 2
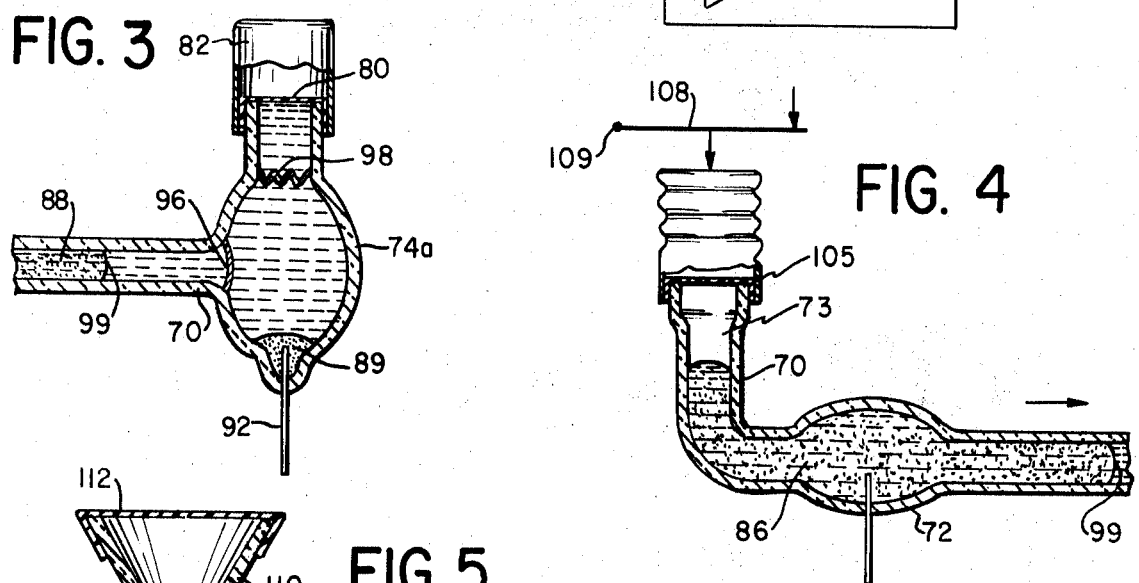
FIG. 3
FIG. 4
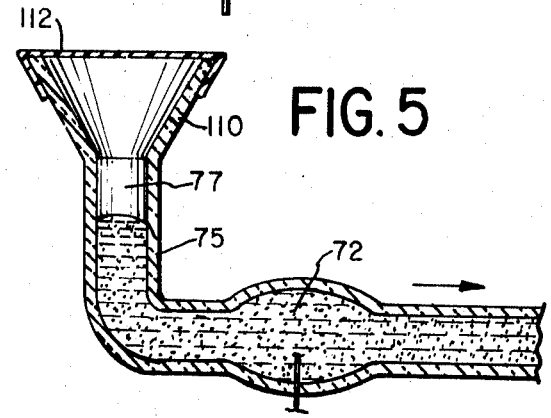
FIG. 5

TRANSDUCER DEVICE

This application is a continuation-in-part of my prior copending application Ser. No. 37,965 filed May 18, 1970 entitled "Liquid State Switching Device", now Pat. No. 3,701,868.

In my prior copending application, switching devices are disclosed of the type which utilize a mercury column and an electrolyte. The mercury is immiscible with the electrolyte and a single interface is provided between the mercury column and the electrolyte. When a voltage is applied to electrodes properly located on the device, the interfacial tension is disturbed and the mercury column is caused to move. The movement of the column is used to actuate various types of switching devices.

The present invention relates to a transducer using the electrocapillary effect. In accordance with the invention, a transducer is provided which also uses a single interface between the mercury column and the electrolyte. Here, however, a force is applied to move the mercury column. The force disturbs the interfacial tension between the mercury column and the electrolyte and the containing capillary tube wall and a voltage is generated. The voltage so generated can be used, with or without shaping, to operate other electrical devices.

It is therefore an object of the present invention to provide various types of transducers using the electrocapillary effect.

A further object is to provide a transducer using the electrocapillary effect in which there is a single interface between a column of a conductive metal, such as mercury, and an electrolyte solution.

Other objects and advantages of the present invention will become more apparent upon reference to the following specification and annexed drawings in which:

FIG. 1 is a plan view in cross section showing a switching device of my prior application;

FIG. 2 is a plan view in cross section of one form of transducer according to the present invention, and also showing suitable electronic circuits for use with the transducer;

FIG. 3 is a fragmentary view in cross-section of a modification of a portion of the transducer of FIG. 2;

FIGS. 4 and 5 are plan views in cross-section of portions of transducers showing other forms of input sensors.

FIG. 1 which corresponds to FIG. 4 of the aforementioned co-pending application illustrates the principles of electrocapillary phenomena, and how this effect can be utilized in the construction of a simple liquid-state switching device with many pracitcal applications and advantages.

In FIG. 1 there is an envelope 10 including a capillary tube 12, a reservoir 16, integrally fused with the capillary tube at one end thereof and having a common fluid path 17 with the tube, a reservoir 18, integrally fused with the tube 12 at the other end thereof and also having a common fluid path 19 with the tube, a sleeve 20, integrally fused with the reservoir 16 and having a common fluid path 21 therewith, and a reservoir 22, integrally fused with the reservoir 18 and having a common fluid path 23 therewith.

A column of a liquid metal, such as mercury 18 substantially fills the reservoir 16, and extends into and partially fills both the capillary tube 12 and the sleeve 20. An electrolyte 30 substantially fills the reservoir 16, and extends into and partially fills the capillary tube 12, forming an interface 29 in the capillary tube with the mercury column 28. A quantity of gas, which may be air, substantially fills the reservoir 22, preferably at a pressure slightly greater than atmospheric, creating a gas pocket 24 therein. An electrode 34 is integrally fused into the envelope 10 at the reservoir 16, and contacts the mercury column 18. A mercury pool 36 is contained within the reservoir 28 and contacts the electrolyte 30. A terminal 38 is integrally fused into the envelope 10 at the reservoir 28, and contacts the mercury pool 36.

The interior dimensions of the reservoir 28 are sufficiently large and the quantity of mercury 36 sufficiently great that the surface area of the interface 35 is large compared to the surface area of the mercury column interface 29. This construction yields a non-polarizable electrode so that the undesirable effects of operating the metallic liquid at interface 35 in an anode configuration are substantially reduced, and the efficacy of the electrode to establish the desired potential in the electrolyte is increased. Similar non-polarizable electrodes may be employed, and it is apparent to one skilled in the art that the mercury 36 may readily be substituted by other materials, for example mercurous chloride, in which case a calomel electrode is obtained.

A filter partition 40 is positioned in the fluid path 23 between the reservoir 28 and the reservoir 22 and substantially fills the path 23 so that all fluid flow must pass through the filter partition 40. The filter partition 40 is impervious to the electrolyte 30 and completely pervious to the gas contained in the gas pocket 24. A second filter partition 42 is positioned in, and substantially occupies, the fluid path 19 so that all fluid flow must pass through the filter partition 42. The filter partition 42 is impervious to mercury and completely pervious to the electrolyte. The filter partitions 40 and 42 increase the positional stability of the switching device by restricting the motion of the interface 29 to the capillary tube 12, thereby preventing the flow of the mercury or electrolyte to an improper cavity.

An insulating plunger 44 is carried within the sleeve 20 and travels in an axial direction therewithin. The mercury column 18 contacts the insulating plunger 44, which substantially occupies the interior transverse area of the sleeve 20 so that no mercury can by-pass the plunger 44 at the bearing surface between the plunger and the sleeve wall. The plunger 44 has a concave top surface 44a with a drop of mercury 44b therein. An insulating spacer 48 seals the open end of the sleeve 20 and carries a pair of spaced electrodes 52 and 54. A cavity 50 is located within the sleeve 20 between the plunger 44 and the spacer 48.

The electrodes 52 and 54 extend through the spacer 48 into the cavity 50. When a suitably low voltage of preferred (selected) polarity is impressed across the electrodes 34 and 38 the resultant electrocapillary force causes the mercury column 18 to exert a pressure on the plunger 44 to cause it to move upward. The drop of mercury 44b contacts the ends of the electrodes 52 and 54 to complete an electrical circuit between them.

The theory of the electrocapillary phenomenon is disclosed in the aforesaid application and will not be repeated here. If the procedure is reversed and a motion of the mercury column is brought about by any means whatsoever (force, pressure, acceleration, impulse, etc.), a voltage will be generated between the electrodes 34 and 38 of FIG. 1.

FIG. 2 shows a transducer constructed according to the invention which utilizes the electrocapillary effect. The transducer utilizes some of the components of the switch of FIG. 1. Here a capillary tube 70 is located between reservoirs 72 and 74 at the ends thereof. Reservoir 72 has an open tubular arm 73 to which a compressible member, such as a piece of rubber tubing 75 with a closed end 76 is attached. The reservoir 74 is longer than reservoir 72 and includes a lower extension portion 78 which is tipped off. The end of reservoir 72 in sealed off by an elastic membrane 80 which can be of rubber, metal or other suitable material. A cap 82 covers the membrane 80 leaving a pocket 83 therebetween. The pocket 83 is filled with air or other highly compressible gas.

A pool of a metallic liquid 86, such as mercury, is placed in the reservoir 72. The mercury extends part way up into the arm 73 leaving a pocket 77 between the closed end 76 of the tube 75 and the mercury in arm 73. The pocket 77 can be filled with air, another suitable gas, or a liquid which will not mix with the mercury 86. A column of the mercury 88 extends into the capillary tube 70.

The main portion of reservoir 74 is filled with an electrolyte solution 87 and the reservoir extension 78 has a mercury pool 89. A first output terminal, or electrode 90, passes into the reservoir 72 to contact the mercury 86 and a second output terminal 92 passes into the reservoir extension 78 to contact the mercury pool 89.

A first filter partition 96, for example of fritted glass is located between the end of capillary tube 70 and the reservoir 74 and a second filter partition 98, which also can be of fritted glass, is located between the mercury pool 89 and the electrolyte 87. These filter partitions serve the same function as elements 40 and 42 of FIG. 1. Other filter partitions of various degrees of porosity may be used in different sections or locations of the transducer device, in order to make the transducer operation fool-proof.

A single interface 99 is formed between the column of mercury 88 and the electrolyte 87 in the capillary tube 70. The operation of the device is described below.

Pinching the tube 75 above the end of the column of mercury in arm 73 will cause an impulse of energy in the column of liquid or gas in the arm. This impulse is transmitted through the mercury in reservoir 86 and in the column 88 to disturb the interface 99 between the mercury column and the electrolyte and to cause it to move. This motion causes change in surface tension of the single interface 99 and produces a voltage which appears across the two terminals 90 and 92. The magnitude of the voltage depends upon several factors including, for example, the amount of force applied to the mercury column 88, the size of the column, the size of the interface, the suddenness or speed of application of the force, etc.

As the mercury column 88 moves, the electrolyte 87 in reservoir 74 will also move causing the elastic membrane 80 to move (expand) thereby compressing the gas in the pocket 83 between the membrane and the cap 82. This absorbs the shock of the original energy impulse. Once the force is released from the rubber tube 75, the gas in pocket 83 will expand and return the membrane 80 to its initial position. This will restore the system to an equilibrium condition with the meniscus at the interface 99 at the same reaction At this time, the understood voltage which has been generated across the terminals 90 and 92 will drop back to zero. In some cases, depending upon the elasticity and reaction of the membrane 80, there will be an overshoot of opposite polarity of the voltage produced across the terminals 90 and 92. That is, there will be a movement of the mercury column 88 to the left beyond its original position before the force was applied to the tube 75.

It should be understood that the response time of the production of the voltage can be controlled by properly selecting the fluid or liquid in the pocket 77 between the tube 75 and the end of the mercury column 86 in arm 73. That is, if an incompressible liquid is used in pocket 77, there will be a rapid, if not instantaneous reaction of the production of the voltage when a force is applied to tube 75. On the other hand, if a compressible medium is utilized in pocket 77, the reacion will be delayed by the amount of time it takes the force applied to the tube 75 to compress the medium and move the body of mercury 86. As should be apparent, this provides a readily simply way of forming a controlled reation transducer with desired delay or response characteristics. It should also be un derstood that the membrane 80 can be damped to control its response characteristics.

Any suitable device can be used for applying the force to the tube 75. In general, it is preferred that some form of arrangement be used which can apply a relatively large amount of force substantially instantaneously.

FIG. 2 also shows one form of circuit for conditioning the voltage signal produced by the transducer. The output terminals 90 and 92 are connected respectively to the common input and a positive input of a voltage amplifier which can be any conventional amplifier 100 operated, for example, in a class B mode. The purpose of this is to clip off any negative going signal, assuming the transducer is constructed to produce a positive voltage. The output of amplifier 100 is then applied to a signal conditioner 101 which can be, for example, a wave shaper to square the voltage. It should be understood, of course, that any suitable signal conditioner can be used to produce any desired waveform.

A typical application of the transducer would be for counting or sorting. Here, each object to be counted or sorted would actuate the input sensor of the transducer and produce a pulse of voltage across its output terminals.

FIG. 3 shows a further embodiment of a portion of the invention in which the shape of the reservoir 74 has been changed from one which is substantially lying along the longitudinal axis of the capillary tube 70 to one which is substantially vertical to this axis. The reservoir 72 would be of the same construction and there would still be only a single interface 99. The operation of the device is otherwise as previously described.

FIG. 4 shows another embodiment of the invention utilizing a somewhat different input device, or sensor, on the arm 73 of the reservoir 72 for moving the mercury 86 therein. The reservoir 74 can be as shown in either of FIGS. 2 or 3. Here, an elastic bellows seals the end of the arm 73. The pocket 77 between the end of the mercury column 86 and the end of the diaphragm 105 is filled with a compressible or incompressible medium, as previously described.

A lever 108 operating about a fulcrum point 109 contacts the upper surface of the diaphragm 105. A force on the end of the lever 108 will cause the elastic bellows to compress and move the column of mercury to the right so that the interface 99 will be disturbed. This will produce the voltage across the terminals of the transducer in the manner previously described. It should be understood that the length of the lever can be changed so as to achieve any desired mechanical advantage.

FIG. 5 shows a still further form of input device in which the end of the arm 73 has a conical shaped member 110 thereon with the member 110 being sealed by a resilient diaphragm 112. Diaphragm 112 can be of any suitable material such as rubber, glass, metal, or a non-metal. Again, any incompressible or compressible fluid or gas can be located in the pocket 77. Also, the reservoir 74 can be as shown in either of FIGS. 2 or 3.

The transducers of the present invention have several advantages over prior art devices when used for the input device of systems, or circuits, for counting, sorting, intermittent operations of various types, monitoring, etc. Several of these advantages are:
1. power consumption — very small, (on the order of milliwats) with high efficiency.
2. physical size — very small.
3. weight — very light.
4. life — long life since no moving parts.
5. explosion-proof — since device is completely enclosed, eliminating possibility of spartks, it presents no fire hazard.
6. speed of operation — has a high response speed which makes it suitable for high-speed operations.

To further understand the advantages, it should be considered that most of the present input devices for systems of the type listed above are large and cumbersome in size and weight, generally of short life, expensive not only in initial cost but also in power required to operate them, as well as in cost of maintenance. As examples of the presently used input devices, a few of the most common and popular types are the microswitch, photocell and airflow types.

Microswitch devices, being mechanical in character, have a relatively short operating life. The mechanical and electrical life of these systems is on the order of a few million operations. Most of them use relatively high voltages and present a potential shock hazard.

Photocell devices of the existing input systems are the most reliable, with the longest life. Burnout of the light source and dirt over the photocell surface are the chief reasons for failure. They also suffer other serious handicaps. Among these are: (a) the light source requires relatively large power and is physically of large size; (b) the sensing device is also large in size and has a relatively high power consumption; and (c) the system can be used only where the object that breaks the light beam is not transparent.

Air flow input devices are used where the item to trip the sensing element is very small in weight or is a transparent object. This is done by pointing a very small jet of air at a sensitive air switch. The item passes across the air jet interrupting the jet and allowing the air-operated switch to open or close as desired. This system is high in power consumption since it requires an air-compressor running constantly. Further, the unit is quite large in size. This is the least used type of input devices As should be apparent, the transducers of the present invention overcome many of the disadvantages of the prior art devices.

It should be understood that in the present invention the concept of a single interface between mercury and electrolyte is also utilized as in the aforesaid prior co-pending application. This eliminates the unpredictability of operation which occurs when double or multiple interfaces, such as a globule of mercury between two electrolyte capillary columns, or the reverse thereof, as well as series of alternate globules of mercury and electrolyte in series fashion are used.

In the prior application it is disclosed that where a greater force action is needed in a particular switching application, it is only necessary to construct a number of single-interface capillary tubes in parallel assembly with all capillary elements having common electrode terminals at each end of the composite structure. This arrangement multiplies the force. The same principle is valid in the case of the reverse capillary or the transducer type of device. By using the concept of placing a number of capillary tubes with single interfaces in parallel operation a greater output voltage is produced for the same source applied impulse.

While the preferred embodiment of the invention contemplates the application of the force to the portion of the envelope containing the liquid metal, it should be understood that the reverse arrangement also can be utilized, that is, apply the force to the electrolyte. In either case, the surface tension is disturbed at the single interface.

What is claimed is:
1. An electrocapillary transducer comprising an envelope including a tube portion having capillary transverse interior dimensions; a metallic liquid contained within said envelope and extending into said tube portion; a liquid electrolyte contained within said envelope and extending into said tube portion, said metallic liquid and said electrolyte being immiscible in each other and forming a single interface only in said capillary tube; means external of said envelope for applying a force across said metallic liquid and said electrolyte effective to move the interface of said liquids and to change the interfacial tension between said liquids whereby a voltage is produced due to the electrocapillary effect, said means including means for sealing off an end of said envelope and a material between said sealing means and one of said liquids for transmitting the force to the said one liquid; and electrode means respectively in electrical contact with said metallic liquid and said electrolyte across which said voltage appears.

2. A transducer as in claim 1 wherein said sealing means communicates with said material in communication with one of said metallic and said electrolyte liquids and transmits force to said material to move the interface.

3. A transducer as in claim 2 wherein said material is compressible.

4. A transducer as in claim 2 wherein said material is incompressible.

5. A transducer as in claim 1 wherein said envelope includes a reservoir for containing one of said metal and electrolyte liquids, means for providing a column of the material in communication with said one liquid in said reservoir, said sealing means applying force to said column of material and forming a closed system to the atmosphere for said material, which force is transmitted through the material and the liquid in the reservoir to the interface of the metal and the electrolyte.

6. A transducer as in claim 5 wherein said sealing means comprises a tube of compressible material having a closed end.

7. A transducer as in claim 5 wherein said sealing means comprises a bellows, and means for moving said bellows.

8. A transducer as in claim 5 wherein said sealing means comprises a conical shaped member having a diaphragm at its open end.

9. A transducer as in claim 5 further comprising means responsive to the movement of said fluids produced by the force for restoring the fluids in the transducer to an equilibrium condition when the force is removed.

10. A transducer as in claim 9 wherein said means for applying said force applies to one of said fluids and said restoring means comprises movable means in communication with the other fluid and responsive to the movement of the other fluid produced by the force, and means responsive to the movement of said movable means for restoring the equilibrium of the fluids.

11. A transducer as in claim 1 further comprising means responsive to the movement of the fluids produced by said force for restoring the fluids in the transducer to an equilibrium condition when the force is removed.

12. A transducer as in claim 11 wherein said means for applying said force applies to one of said fluids and said restoring means comprises movable means in communication with the other fluid and responsive to the movement of the other fluid produced by the force, and means responsive to the movement of said movable means for restoring the equilibrium of the fluids.

13. A transducer as in claim 12 wherein said movable means comprises a resilient member in communication with said other fluid and responsive to its movement, said restoring means including means covering the resilient member and spaced therefrom to form a chamber.

14. A transducer as in claim 13 wherein said chamber includes a compressible material.

15. An electrocapillary transducer comprising an envelope including a tube portion having capillary transverse interior dimensions; a metallic liquid contained within said envelope and extending into said tube portion; a liquid electrolyte contained within said envelope and extending into said tube portion, said metallic liquid and said electrolyte being immiscible in each other and forming a single interface only in said capillary tube; means external of said envelope for applying a force across said metallic liquid and said electrolyte effective to move the interface of said liquids and to change the interfacial tension between said liquids whereby a voltage is produced due to the electrocapillary effect; electrode means respectively in electrical contact with said metallic liquid and said electrolyte across which said voltage appears; and means responsive to the movement of said fluids produced by said force for restoring the fluids in the transducer to an equilibrium condition when the force is removed.

16. A transducer as in claim 15 wherein said means for applying said force applies to one of said fluids and said restoring means comprises movable means in communication with the other fluid and responsive to the movement of the other fluid produced by the force, and means responsive to the movement of said movable means for restoring the equilibrium of the fluids.

* * * * *